United States Patent
Gottipati et al.

(10) Patent No.: US 12,056,526 B2
(45) Date of Patent: Aug. 6, 2024

(54) SYSTEM AND METHOD FOR REFERENCE-AWARE APPLICATION RECREATION IN CONTAINER DEPLOYMENT ENVIRONMENTS

(71) Applicant: Druva Inc., Sunnyvale, CA (US)

(72) Inventors: Srikiran Gottipati, Vijayawada (IN); Preethi Srinivasan, Sunnyvale, CA (US); Stephen Manley, Livermore, CA (US); Nishith Chitaliya, Amravati (IN)

(73) Assignee: Druva Inc., Santa Clara, CA (US)

( * ) Notice: Subject to any disclaimer, the term of this patent is extended or adjusted under 35 U.S.C. 154(b) by 0 days.

(21) Appl. No.: 17/720,034

(22) Filed: Apr. 13, 2022

(65) Prior Publication Data

US 2023/0129934 A1 Apr. 27, 2023

(30) Foreign Application Priority Data

Oct. 26, 2021 (IN) .............................. 202141048856

(51) Int. Cl.
  *G06F 9/50* (2006.01)
  *G06F 8/60* (2018.01)
  *G06F 11/14* (2006.01)

(52) U.S. Cl.
  CPC .............. *G06F 9/5005* (2013.01); *G06F 8/60* (2013.01); *G06F 11/1461* (2013.01); *G06F 11/1469* (2013.01); *G06F 2201/84* (2013.01)

(58) Field of Classification Search
  CPC ........................................................ G06F 8/60
  See application file for complete search history.

(56) References Cited

U.S. PATENT DOCUMENTS

| | | | | |
|---|---|---|---|---|
| 8,869,140 B2 * | 10/2014 | Todorova | .................. | G06F 8/61 |
| | | | | 717/126 |
| 9,043,747 B2 * | 5/2015 | Eksten | ................ | G06F 9/44521 |
| | | | | 717/113 |

(Continued)

FOREIGN PATENT DOCUMENTS

| | | | |
|---|---|---|---|
| CN | 109656717 A | * 4/2019 | |
| CN | 106713460 B | * 12/2019 | ............. H04L 67/32 |

(Continued)

OTHER PUBLICATIONS

Peinl et al., "Docker Cluster Management for the Cloud—Survey Results and Own Solution", Apr. 2016, Springer (Year: 2016).*
Bakhshi et al., "Fault-tolerant Permanent Storage for Container-based Fog Architectures", 2021, IEEE (Year: 2021).*
Yeh et al., "KubeShare: A Framework to Manage GPUs as First-Class and Shared Resources in Container Cloud", Jun. 2020, ACM (Year: 2020).*

(Continued)

*Primary Examiner* — Wei Y Zhen
*Assistant Examiner* — Junchun Wu
(74) *Attorney, Agent, or Firm* — IceMiller LLP (57) ABSTRACT

A system for reference-aware application recreation in a container deployment environment is presented. The system includes a reference detection module configured to detect and store one or more reference paths corresponding to each resource type of a plurality of resources in the container deployment environment; a resource ordering module configured to generate a recreation sequence by ordering the plurality of resources based on corresponding references at the reference paths, such that a referenced resource is recreated before the referring resource; and an application recreation module configured to recreate an application based on the recreation sequence. A related method is also presented.

17 Claims, 5 Drawing Sheets

(56) References Cited

U.S. PATENT DOCUMENTS

| | | | |
|---|---|---|---|
| 10,324,696 B2 * | 6/2019 | Bhat | G06F 8/60 |
| 10,452,372 B2 * | 10/2019 | Lundberg | G06F 8/70 |
| 10,908,887 B2 * | 2/2021 | Bhat | G06F 8/63 |
| 2009/0172689 A1 * | 7/2009 | Bobak | G06F 9/5061 |
| | | | 718/104 |
| 2016/0019096 A1 * | 1/2016 | Winterfeldt | G06F 9/5077 |
| | | | 717/177 |
| 2020/0301727 A1 * | 9/2020 | Aronov | G06F 8/60 |
| 2021/0365308 A1 * | 11/2021 | Myneni | G06F 9/546 |
| 2023/0035310 A1 * | 2/2023 | Denneman | G06N 3/084 |
| 2023/0129934 A1 * | 4/2023 | Gottipati | G06F 8/60 |
| | | | 717/168 |
| 2023/0147068 A1 * | 5/2023 | Rao | H04L 67/10 |
| | | | 707/719 |

FOREIGN PATENT DOCUMENTS

| | | | | |
|---|---|---|---|---|
| CN | 110737442 A | * | 1/2020 | G06F 8/60 |
| CN | 110737442 B | * | 6/2021 | G06F 8/60 |
| CN | 111124618 B | * | 8/2022 | G06F 8/60 |

OTHER PUBLICATIONS

Pawlik et al., "Recreation of Containers for High Availability Architecture and Container-Based Applications", 2019, Springer (Year: 2019).*

Mijumbi et al., "Topology-Aware Prediction of Virtual Network Function Resource Requirements", 2017, IEEE (Year: 2017).*

* cited by examiner

FIG. 1

```
k8s.io/api/core/v1/TypedLocalObjectReference:
  fields:
    apiGroup:
      fieldPath: '{.apiGroup}'
      optional: true
    kind:
      fieldPath: '{.kind}'
    name:
      fieldPath: '{.name}'
```

FIG. 2

```
k8s.io/api/core/v1/ObjectReference:
  fields:
    apiVersion:
      fieldPath: '{.apiVersion}'
      optional: true
    kind:
      fieldPath: '{.kind}'
      optional: true
    namespace:
      fieldPath: '{.namespace}'
      optional: true
    name:
      fieldPath: '{.name}'
      optional: true
    uid:
      fieldPath: '{.uid}'
      optional: true
    resourceVersion:
      fieldPath: '{.resourceVersion}'
      optional: true
```

FIG. 3

```
PersistentVolumeClaim:
  versions:
    v1:
      namedReferences:
        '{.spec.storageClassName}':
          groupKinds:
          - StorageClass.storage.k8s.io
        '{.spec.volumeName}':
          groupKinds:
          - PersistentVolume
      typedLabelSelectors:
        '{.spec.selector}':
          groupKind: Pod
          type: k8s.io/apimachinery/pkg/apis/meta/v1/LabelSelector
      typedReferences:
        '{.spec.dataSource}':
          groupKinds:
          - PersistentVolume
          - PersistentVolumeClaim
          type: k8s.io/api/core/v1/TypedLocalObjectReference
```

FIG. 4

```
Given Resources as a loop-less directed graph with resources as
vertices and references as edges Restored = nil
Reversed = nil function RestoreAll()
   for each R in Resources do
      if PreRestoreCheck(R) then
         Restore(R)
      end
   end
end function Restore(R)
   R' = Restored[R.UID]
   if R' != nil then
      return R'
   end R' = CopyResource(R)
   R' = PreRestorePatch(R')

for each (fieldPath, reference F) in R.References do
      if PreRestoreCheck(F) then
         if F.reversed == false then
            R'.fieldPath = Restore(F)
         elif Restored[F.UID] != nil then
            R'.fieldPath = Restored[F.UID]
         else
            Reversed[F.UID] = Append(Reversed[F.UID], R.UID)
         end
      else
         R'.fieldPath = nil
      end
   end
```

```
CreateResource(R')
   Restored[R.UID] = R' for each UID in Reversed[R.UID] do
      F' = Restored[UID]
      F'.fieldPath = R'
      UpdateResource(F')
   end R' = PostRestorePatch(R')
   UpdateResource(R')

return R'
end
```

SYSTEM AND METHOD FOR REFERENCE-AWARE APPLICATION RECREATION IN CONTAINER DEPLOYMENT ENVIRONMENTS

CROSS REFERENCE TO RELATED APPLICATION

This application claims a benefit of, and priority to, India Provisional Patent Application No. 202141048856, filed Oct. 26, 2021, the contents of which is incorporated by reference in its entirety.

BACKGROUND

Embodiments of the present invention generally relate to application recreation in container deployment environments, and more particularly to reference-aware application recreation in a Kubernetes environment.

An application running within a Kubernetes environment consists of native Kubernetes resources (e.g., service accounts, stateful sets, persistent volumes, secrets, etc.) and custom resources that are defined specifically for that application which create their own dependencies. These resources that constitute an application have references to each other that were set up by their respective controllers during normal operations. Therefore, they need to be recovered in an orderly fashion to ensure complete application recovery/recreation in case of accidental deletion, ransomware, compliance needs, cloning, etc.

However, current Kubernetes data protection solutions use a static list of Kubernetes ResourceTypes as a method for deciding the order in which resources are recovered. In addition to that, the recovery of each ResourceType is explicitly coded to handle the references and update the reference information with a new name, namespace, uid, etc. as they are subject to change. The problem with such an approach is that the references are not dynamically handled and the solution needs to continually be upgraded to handle new custom resources as they are installed.

Thus, there is a need for systems and methods that provide for reference-aware application recreation in a Kubernetes environment.

SUMMARY

The following summary is illustrative only and is not intended to be in any way limiting. In addition to the illustrative aspects, example embodiments, and features described, further aspects, example embodiments, and features will become apparent by reference to the drawings and the following detailed description.

Briefly, according to an example embodiment, a system for reference-aware application recreation in a container deployment environment is presented. The system includes a reference detection module configured to detect and store one or more reference paths corresponding to each resource type of a plurality of resources in the container deployment environment; a resource ordering module configured to generate a recreation sequence by ordering the plurality of resources based on corresponding references at the reference paths, such that a referenced resource is recreated before the referring resource; and an application recreation module configured to recreate an application based on the recreation sequence.

According to another example embodiment, a system for reference-aware application recreation in a container deployment environment is presented. The system includes a memory storing one or more processor-executable routines; and a processor communicatively coupled to the memory. The processor is configured to execute the one or more processor-executable routines to detect and store one or more reference paths corresponding to each resource type of a plurality of resources in the container deployment environment; generate a recreation sequence by ordering the plurality of resources based on corresponding references at the reference paths such that a referenced resource is recreated before the referring resource; and recreate an application based on the recreation sequence.

According with another example embodiment, a method for reference-aware application recreation in a container deployment environment is presented. The method includes detecting and storing one or more reference paths corresponding to each resource type of a plurality of resources in the container deployment environment; generating a recreation sequence by ordering the plurality of resources based on corresponding references at the reference paths such that a referenced resource is recreated before the referring resource; and recreating an application based on the recreation sequence.

BRIEF DESCRIPTION OF THE FIGURES

These and other features, aspects, and advantages of the example embodiments will become better understood when the following detailed description is read with reference to the accompanying drawings in which like characters represent like parts throughout the drawings, wherein.

DETAILED DESCRIPTION OF EXAMPLE EMBODIMENTS

Various example embodiments will now be described more fully with reference to the accompanying drawings in which only some example embodiments are shown. Specific structural and functional details disclosed herein are merely representative for purposes of describing example embodiments. Example embodiments, however, may be embodied in many alternate forms and should not be construed as limited to only the example embodiments set forth herein. On the contrary, example embodiments are to cover all modifications, equivalents, and alternatives thereof.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figures. It should also be noted that in some alternative implementations, the functions/acts/steps noted may occur out of the order noted in the figures. For example, two figures shown in succession may, in fact, be executed substantially concurrently or may sometimes be executed in the reverse order, depending upon the functionality/acts involved.

Further, although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or a section. Thus, a first element, component, region, layer, or section discussed below could be termed a second element, component, region, layer, or section without departing from the scope of example embodiments.

Spatial and functional relationships between elements (for example, between modules) are described using various terms, including "connected," "engaged," "interfaced," and "coupled." Unless explicitly described as being "direct," when a relationship between first and second elements is described in the description below, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular example embodiments only and is not intended to be limiting. Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless specifically stated otherwise, or as is apparent from the description, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Example embodiments of the present description provide systems and methods for reference-aware application recreation in a container deployment environment. Non-limiting examples of container deployment environments include Docker Swarm, Kubernetes, Openshift, Hashicorp, Rancher, Mesos, cloud container environments in AWS, Azure, Google Cloud, and the like. For the purpose of this description, the following embodiments are described with respect to a Kubernetes-based container deployment environment. However, it must be understood that embodiments described herein can be implemented in any container deployment environment. Non-limiting examples of application recreation use cases include backup restore, disaster recovery, compliance recreation, cloning, accidental deletion-related recreation, ransomware-related recreation, malicious deletion-related recreation, and the like. In particular embodiments, the systems and methods allow for reference-aware application restore in a container deployment environment.

Figure 1:
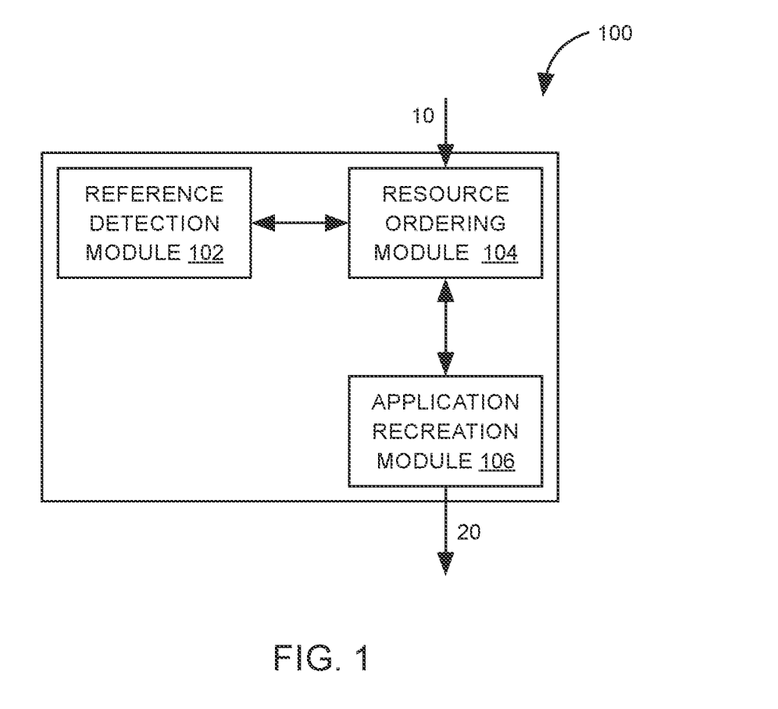
FIG. 1 is a block diagram illustrating an example system for application recreation in container deployment environments, according to some aspects of the present description.

FIG. 1 illustrates an example system 100 for reference aware recreation in a container deployment environment. The system 100 includes a reference detection module 102, a resource ordering module 104, and an application recreation module 106. Each of these modules is described in detail below.

As mentioned earlier, applications running on a Kubernetes cluster consist of a set of Kubernetes resources created at installation time or post-installation runtime. The resources created at installation may include native Kubernetes resources (e.g., service accounts, stateful sets, persistent volumes, secrets, and the like), and potentially custom resources that are defined specifically for a particular application.

Each resource within the Kubernetes environment is characterized by resource type. Non-limiting examples of resource types in a Kubernetes environment include pods, persistent volumes, persistent volume claims, secrets, services, configmaps, stateful sets, deployments, and the like. The resource types are each characterized by a resource definition. Each resource type is further characterized by a reference path which may include one or more references that point/refer to another resource within the Kubernetes environment. The references are further characterized by reference types.

Thus, Kubernetes resources reference other resources using reference types. Reference types use one or more of the resource fields or selector fields to reference other resources. Non-limiting examples of fields used to identify a Kubernetes resource include API version, Resource Kind, Namespace, Name, Unique Identifier (UID), Group version, and the Group Kind.

Examples of reference types include direct references or label selectors. Direct references reference a single resource using one or more of the resource identity fields. The information present in these references may, in some cases, be insufficient to uniquely identify the referenced resource. But that is only because, the resource's controller is aware of the reference field and has the missing information, required to uniquely identify the referenced resource, in its logic.

Non-limiting examples of direct references may further include Typed References, UntypedReferences, NamedReferences, and owner fields. TypedReferenecs include Reference types with well-defined (golang struct) types within the Kubernetes frameworks. Non-limiting examples of TypedReferences include LocalObjectReference, TypedLocalObjectReference, ObjectReference, SecretReference, CrossVersionObjectReference, Subject, RoleRef and the like.

UntypedReferences are references defined loosely as a collection of field paths, label keys, and/or annotation keys. For example, secret associated with a ServiceAccount has the following annotations which, together, make up the Untyped Reference that references the ServiceAccount:
  kubernetes.io/service-account.name
  kubernetes.io/service-account.uid NamedReferences are a special kind of UntypedReference which is a single field of type string that can be used to reference another resource just by its name. OwnerReferences are part of every resource's metadata and can contain references to its owner resource and any other resources that participate in its management. It's also used to garbage collect resources upon deletion of all OwnerReference resources.

Owner resources use LabelSelector fields as a way to define sets of owned resources that they own and/or manage. In most cases, each owned resource has an OwnerReference entry that back-references the owner resource. For example, a StatefulSet resource identifies the set of all its Pod resources with a label selector, and each Pod resource from that set has an OwnerReference that back references the StatefulSet resource. LabelSelectors may further be classified into StringLabelSelector, TypedLabelSelector, and ObjectLabelSelector.

StringLabelSelector is a selector of type string that accepts SQL style filters. For example, environment=production, tier=frontend. TypedLabelSelectors are selectors with well-defined Kubernetes native types. For example, metav1.LabelSelector defined in k8s.io/apimachinery. ObjectLabelSelector is a selector with the generic object type—map[string]string.

Referring again to FIG. 1, the reference detection module 102 is configured to detect and store one or more reference paths corresponding to each resource type of a plurality of resources in the container deployment environment. The reference detection module 102 is configured to automatically detect the one or more reference paths corresponding to each resource type at start-up or when a new resource definition (i.e., custom resource definition (CRD)) is identified.

In some embodiments, the reference detection module 102 is configured to detect the one or more reference paths corresponding to each resource type by scanning binary schema. In some embodiments, the reference detection module 102 is configured to detect the one or more reference paths corresponding to each resource type by scanning all registered resource schemas using reflection techniques. In such embodiments, the reference detection module 102 is configured to auto-discover reference and selector fields present in all registered Kubernetes native and custom resource types by parsing their binary schemas using type reflection In some other embodiments, for example, when binary schemas are not registered with the runtime client, the reference detection module 102 is configured to detect the one or more reference paths corresponding to each resource type by scanning text schemas for one or more resource types in the container deployment environment. Non-limiting examples of text schemas include open API schemas, postman schemas, JSON API schemas, and the like. In such embodiments, the reference detection module 102 is configured to use reference signatures for the identification of references during a scan of the reference schemas. The reference signatures may be added to the configuration manually.

In an example embodiment, at startup or when notified of new resource definitions, the reference detection module 102 is configured to identify fields with type as one of the known reference types. The reference detection module 102 is further configured to load all resource type definitions registered with the Kubernetes API server and all known reference type signatures specified in the configuration. The reference detection module 102 is further configured to scan each resource type schema for references using the reference type signatures. The reference detection module 102 is further configured to capture and persist the list of field paths along with their corresponding reference types for each resource type.

Figure 2:
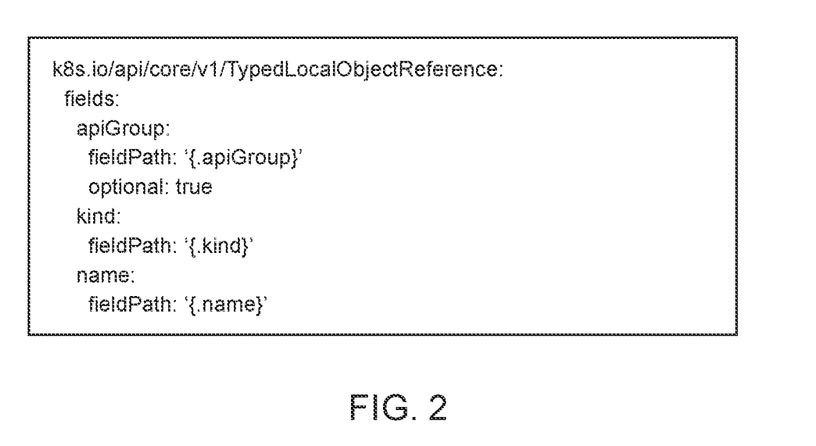
FIG. 2 is an example of a TypedReference, according to some aspects of the present description.
Figure 3:
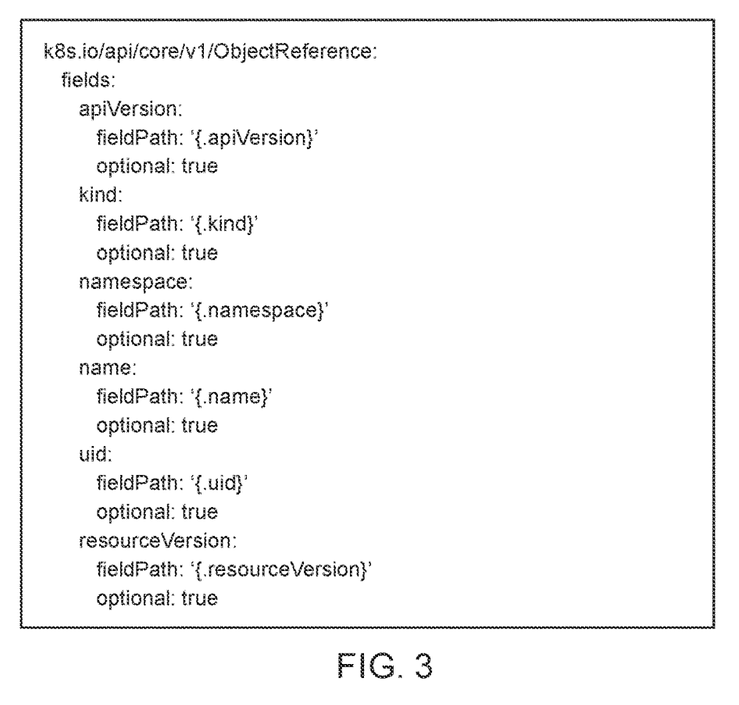
FIG. 3 is an example of ObjectReference, according to some aspects of the present description.

FIG. 2 is an example of a TypedReference called TypedLocalObjectReference defined in the package k8s.io/api/core/v1. TypedLocalObjectReference is a well-defined reference with 3 fields API group, kind, and name where the API group field is optional and the others are mandatory. FIG. 3 is an example of ObjectReference having 6 fields—apiVersion, kind, namespace, name, UID, and ResourceVersion.

Figure 4:
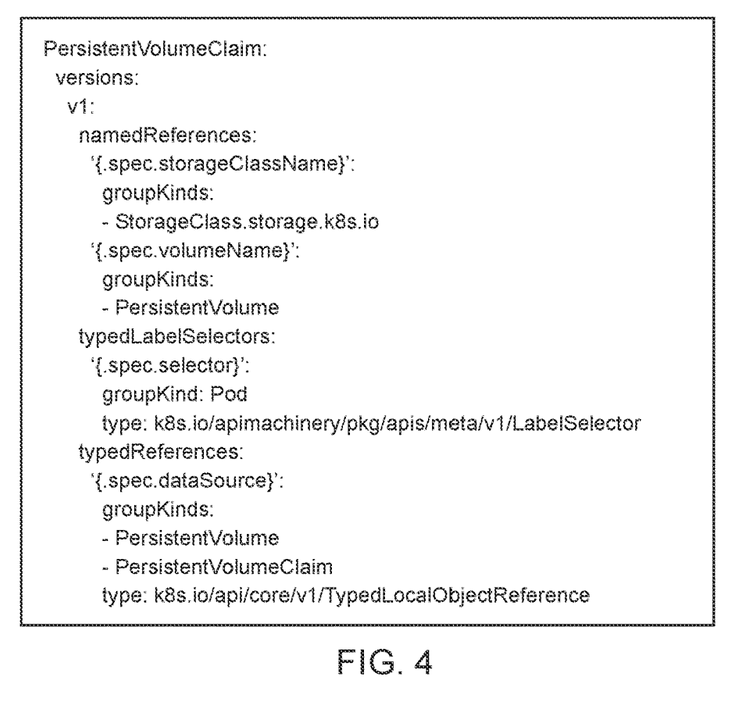
FIG. 4 is an example of the references in the PersistentVolumeClaim resource, according to some aspects of the present description.

FIG. 4 is an example of the references in the PersistentVolumeClaim resource. The PersistentVolumeClaim resource has 1 TypedReference of type TypedLocalObjectReference at path spec. dataSource which can reference a PersistentVolume or another PersistentVolumeClaim Referring back to FIG. 1, the reference detection module 102 is further configured to augment auto-detection of the one or more reference paths corresponding to a resource type based on manual updates. In such embodiments, the reference detection module 102 is configured to capture through auto-discovery previously unseen reference types. Further, the reference detection module 102 is configured to specify the expected types of resources that a given reference field can reference.

As noted earlier, the system 100 further includes a resource ordering module 104. The resource ordering module is configured to generate a recreation sequence by ordering the plurality of resources based on corresponding references at the reference paths, such that a referenced resource is recreated before the referring resource.

Every reference present within a referring resource and the referenced resource have a natural order in which they have to be recreated. The referenced resource needs to be recreated before the referring resource. That's because the referring resource will have to update the reference to reflect the newly recreated referenced resource. Thus, the resource ordering module is configured to order the plurality of resources based on the references at the corresponding reference paths.

In some embodiments, the resource ordering module 104 is further configured to manually update the natural order of the references as 'reversed' to remove reference loops or to satisfy resource controller logic. For example, a PersistentVolumeClaim (PVC) has a reference to a PersistentVolume (PV) which also has a reference back to the same PVC. In this case, the resource ordering module 104 is configured to mark the PVC→PV reference as 'reversed' and create the PVC before the PV.

In some embodiments, the resource ordering module 104 is further configured to perform a pre-recreation check for each resource type to check whether a recreation of the resource type is required. The resource ordering module 104 may be configured to define a PreRecreationPatch function in a Domain Specific Language (DSL) to decide whether the resource needs to be recreated or not. For example, a ServiceAccount with the name 'default' need not be recreated as it is created for each namespace by default.

The resource ordering module 104 is further configured to perform a pre-recreation modification for each resource type if one or more reference fields of a resource have to be modified to comply with the sequence of recreation. The resource ordering module 104 may be configured to define a PreRecreationPatch function in DSL to add, delete, and modify fields and/or data to satisfy the recreation order needs of the resource or the controller logic of that resource type.

The resource ordering module 104 is further configured to perform a perform a post-recreation modification for each resource type if one or more reference fields of a resource have to be modified to comply with the sequence of recreation. The resource ordering module 104 may be configured to define a PostRecreationPatch function in DSL to add, delete, modify fields and/or data to satisfy the recreation order needs of the resource or the controller logic of that ResourceType.

Figure 5:
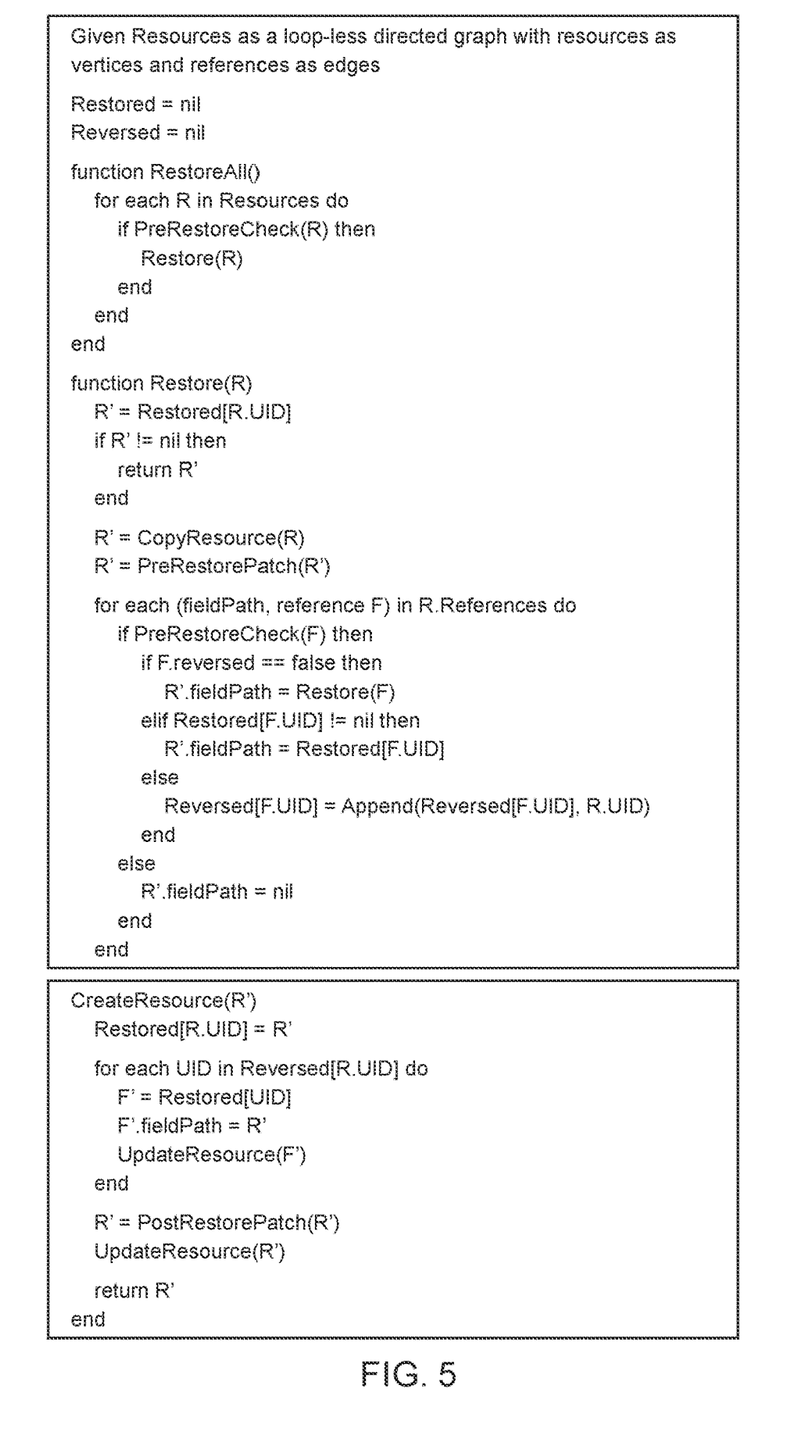
FIG. 5 is an example of a recovery algorithm, according to some aspects of the present description.

In some embodiments, the resource ordering module 104 is further configured to create a resource with an updated name if an identical resource is recreated in the same namespace. The resource ordering module 104 is further configured to detect, based on corresponding references, if one or more resources are shared with more than one application, and generate the recreation sequence such that an application recreation does not conflict with any other application that is currently using the one or more shared resource. FIG. 5 shows an example recovery algorithm in accordance with embodiments of the present description.

Referring again to FIG. 1, the system 100 further includes an application recreation module 106 configured to recreate an application based on the recreation sequence generated by the resource ordering module 104. As noted earlier, non-limiting examples of application recreation use cases include backup restore, disaster recovery, compliance recreation, cloning, accidental deletion-related recreation, ransomware-related recreation, malicious deletion-related recreation, and the like.

Figure 6:
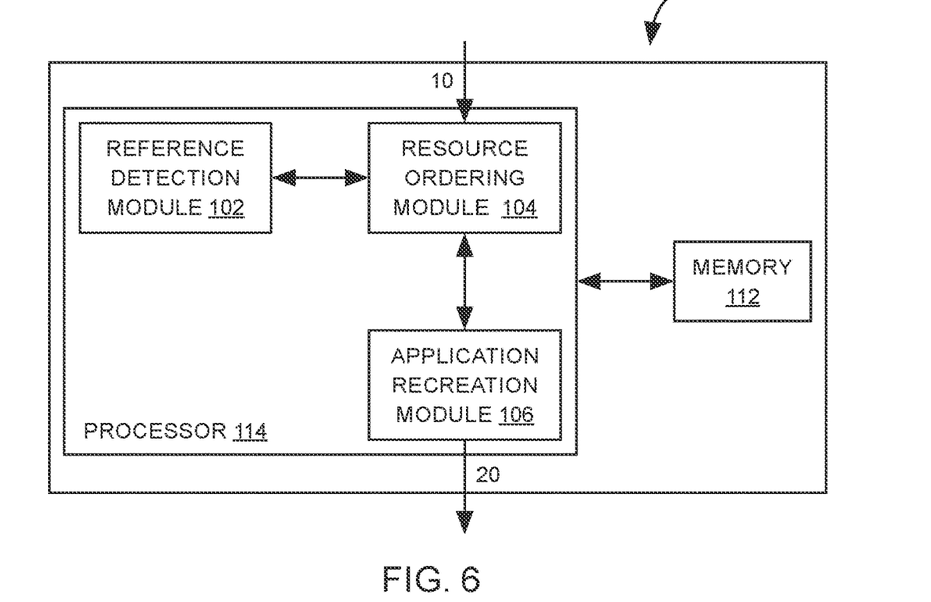
FIG. 6 is a block diagram illustrating an example system for application recreation in container deployment environments, according to some aspects of the present description.

Referring now to FIG. 6, a system 100 for application recreation in a container deployment environment, for example, a Kubernetes environment is presented. The system 100 includes a memory 112 storing one or more processor-executable routines, and a processor 114. The processor 114 includes a reference detection module 102, a resource ordering module 104, and an application recreation module 106. The processor 114 is further configured to execute the processor-executable routines to perform the steps illustrated in the flow-chart of FIG. 7.

Figure 7:
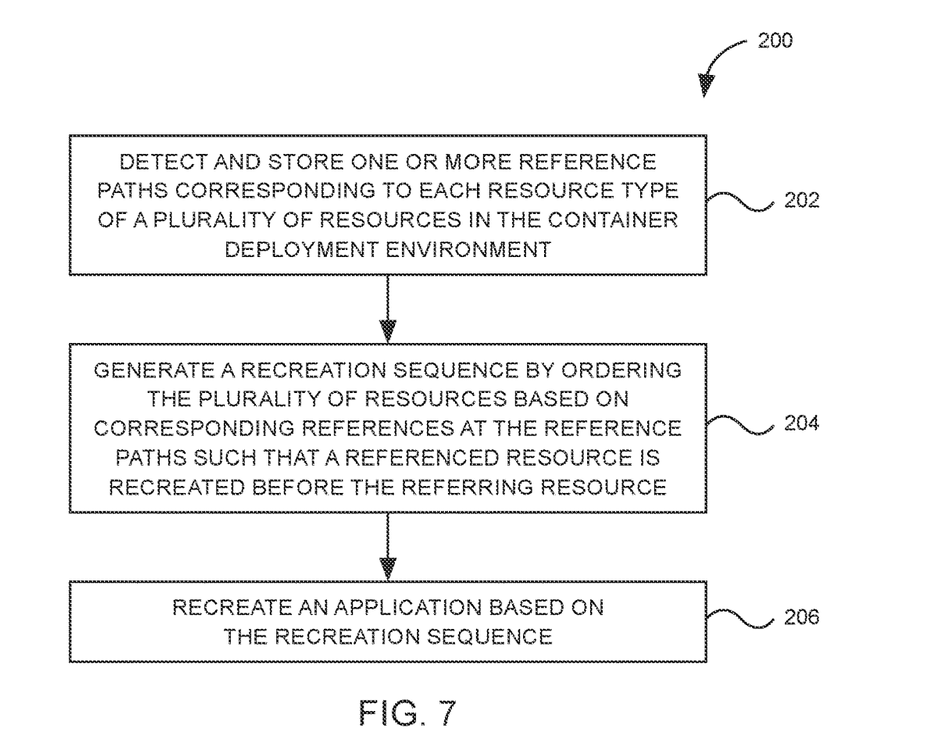
FIG. 7 is a flow chart illustrating a method for application recreation in container deployment environments, according to some aspects of the present description.

FIG. 7 is a flowchart illustrating a method 200 for application recreation in a container deployment environment, for example, a Kubernetes environment. The method 200 may be implemented using the application identification system 100 of FIGS. 1 and 6 according to some aspects of the present description. Each step of the method 200 is described in detail below.

The method 200 includes, at block 202, detecting and storing one or more reference paths corresponding to each resource type of a plurality of resources in the container deployment environment. The method 200 includes, at block 202, automatically detecting the one or more reference paths corresponding to each resource type at start-up or when a new resource definition (i.e., custom resource definition (CRD)) is identified.

In some embodiments, the method 200 includes, at block 202, detecting the one or more reference paths corresponding to each resource type by scanning binary schema. In some embodiments, the method 200 includes, at block 202, detecting the one or more reference paths corresponding to each resource type by scanning all registered resource schemas using reflection techniques. In such embodiments, the method 200 includes auto-discovering reference and selector fields present in all registered Kubernetes native and custom resource types by parsing their binary schemas using type reflection.

In some other embodiments, for example, when binary schemas are not registered with the runtime client, the method 200 includes, at block 202, detecting the one or more reference paths corresponding to each resource type by scanning text schemas for one or more resource types in the container deployment environment. Non-limiting examples of text schemas include open API schemas, postman schemas, JSON API schemas, and the like. In such embodiments, the method 200 includes using reference signatures for the identification of references during a scan of the reference schemas. The reference signatures may be added to the configuration manually.

The method 200 further includes, at block 202, augmenting auto-detection of the one or more references paths corresponding to a resource type based on manual updates. In such embodiments, the method 200 includes capturing through auto-discovery previously unseen reference types. Further, the method 200 includes specifying the expected types of resources that a given reference field can reference At block 204, the method 200 includes generating a recreation sequence by ordering the plurality of resources based on corresponding references at the reference paths such that a referenced resource is recreated before the referring resource. The method 200 further includes, at step 206 recreating an application based on the recreation sequence.

In some embodiments, the method 200 may further include performing a pre-recreation check for each resource type to check whether a recreation of the resource type is required. The method 200 may furthermore include performing a pre-recreation modification for each resource type if one or more reference fields of a resource have to be modified to comply with the sequence of recreation. Moreover, the method 200 may further include performing a post-recreation modification for each resource type if one or more reference fields of a resource have to be modified to comply with the sequence of recreation. In some embodiments, the method 200 further includes creating a resource with an updated name if an identical resource is recreated in the same namespace.

The method further includes detecting, based on corresponding references, if one or more resources are shared with more than one application, and generating the recreation sequence such that an application recreation does not conflict with any other application that is currently using one or more shared resources.

Thus, the system and methods of the present description provide for graph-based reference-aware recovery of Kubernetes resources enabling recreation of resources in the required order for successful application recreation. Further, the system and methods of the present description allow for auto-ordering of the resources into a sequence in which they are recreated based on the auto-discovered references and their augmented information Moreover, with reference awareness, the systems and methods allow for flagging of new ResourceTypes for support which can be quickly supported through configuration updates. The systems and methods of the present description further allow for the creation of Kubernetes objects with updated names if an identical resource is recreated in the same namespace. Furthermore, the systems and methods of the present description provide for reference-based identification of resources shared with more than one application such that recreation does not conflict with other applications that are currently using the shared resource.

The systems and methods described herein may be partially or fully implemented by a special purpose computer system created by configuring a general-purpose computer to execute one or more particular functions embodied in computer programs. The functional blocks and flowchart elements described above serve as software specifications, which may be translated into the computer programs by the routine work of a skilled technician or programmer.

The computer programs include processor-executable instructions that are stored on at least one non-transitory computer-readable medium, such that when run on a computing device, cause the computing device to perform any one of the aforementioned methods. The medium also includes, alone or in combination with the program instructions, data files, data structures, and the like. Non-limiting examples of the non-transitory computer-readable medium include, but are not limited to, rewriteable non-volatile memory devices (including, for example, flash memory devices, erasable programmable read-only memory devices, or a mask read-only memory devices), volatile memory devices (including, for example, static random access memory devices or a dynamic random access memory devices), magnetic storage media (including, for example, an analog or digital magnetic tape or a hard disk drive), and optical storage media (including, for example, a CD, a DVD, or a Blu-ray Disc). Examples of the media with a built-in rewriteable non-volatile memory, include but are not limited to memory cards, and media with a built-in ROM, including but not limited to ROM cassettes, etc. Program instructions include both machine codes, such as produced by a compiler, and higher-level codes that may be executed by the computer using an interpreter. The described hardware devices may be configured to execute one or more software modules to perform the operations of the above-described example embodiments of the description, or vice versa.

Non-limiting examples of computing devices include a processor, a controller, an arithmetic logic unit (ALU), a digital signal processor, a microcomputer, a field programmable array (FPA), a programmable logic unit (PLU), a microprocessor or any device which may execute instructions and respond. A central processing unit may implement an operating system (OS) or one or more software applications running on the OS. Further, the processing unit may access, store, manipulate, process and generate data in response to the execution of software. It will be understood by those skilled in the art that although a single processing unit may be illustrated for convenience of understanding, the processing unit may include a plurality of processing elements and/or a plurality of types of processing elements. For example, the central processing unit may include a plurality of processors or one processor and one controller. Also, the processing unit may have a different processing configuration, such as a parallel processor.

The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Figure 8:
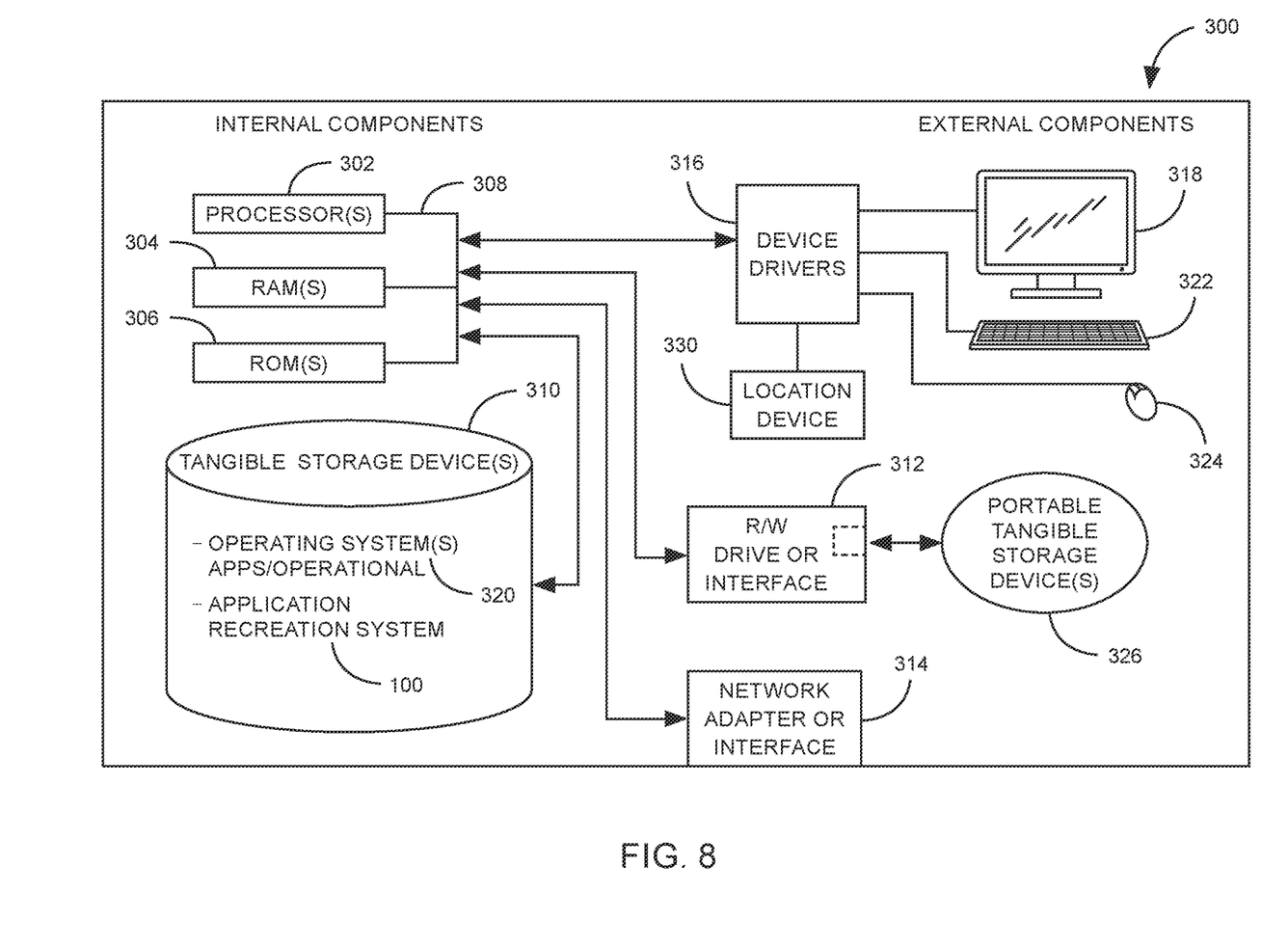
FIG. 8 is a block diagram illustrating an example computer system, according to some aspects of the present description.

One example of a computing system 300 is described below in FIG. 8. The computing system 300 includes one or more processor 302, one or more computer-readable RAMs 304 and one or more computer-readable ROMs 306 on one or more buses 308. Further, the computer system 308 includes a tangible storage device 310 that may be used to execute operating systems 320 and the application recreation system 100. Both, the operating system 320 and application identification system 100 are executed by processor 302 via one or more respective RAMs 304 (which typically includes cache memory). The execution of the operating system 320 and/or the dynamic resource allocation system by the processor 302, configures the processor 302 as a special-purpose processor configured to carry out the functionalities of the operating system 320 and/or the application recreation system 100, as described above.

Examples of storage devices 310 include semiconductor storage devices such as ROM 506, EPROM, flash memory or any other computer-readable tangible storage device that may store a computer program and digital information.

Computer system 300 also includes a R/W drive or interface 312 to read from and write to one or more portable computer-readable tangible storage devices 326 such as a CD-ROM, DVD, memory stick or semiconductor storage device. Further, network adapters or interfaces 314 such as a TCP/IP adapter cards, wireless Wi-Fi interface cards, or 3G or 4G wireless interface cards or other wired or wireless communication links are also included in the computer system 300.

In one example embodiment, the application recreation system 100 may be stored in tangible storage device 310 and may be downloaded from an external computer via a network (for example, the Internet, a local area network or another wide area network) and network adapter or interface 314.

Computer system 300 further includes device drivers 316 to interface with input and output devices. The input and output devices may include a computer display monitor 318, a keyboard 322, a keypad, a touch screen, a computer mouse 324, and/or some other suitable input device.

In this description, including the definitions mentioned earlier, the term 'module' may be replaced with the term 'circuit.' The term 'module' may refer to, be part of, or include processor hardware (shared, dedicated, or group) that executes code and memory hardware (shared, dedicated, or group) that stores code executed by the processor hardware. The term code, as used above, may include software, firmware, and/or microcode, and may refer to programs, routines, functions, classes, data structures, and/or objects.

Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above. Shared memory hardware encompasses a single memory device that stores some or all code from multiple modules. Group memory hardware encompasses a memory device that, in combination with other memory devices, stores some or all code from one or more modules.

In some embodiments, the module may include one or more interface circuits. In some examples, the interface circuits may include wired or wireless interfaces that are connected to a local area network (LAN), the Internet, a wide area network (WAN), or combinations thereof. The functionality of any given module of the present description may be distributed among multiple modules that are connected via interface circuits. For example, multiple modules may allow load balancing. In a further example, a server (also known as remote, or cloud) module may accomplish some functionality on behalf of a client module.

While only certain features of several embodiments have been illustrated and described herein, many modifications and changes will occur to those skilled in the art. It is, therefore, to be understood that the appended claims are intended to cover all such modifications and changes as fall within the scope of the invention and the appended claims.

The invention claimed is:

1. A system for reference-aware application recreation in a container deployment environment, the system comprising:
 a reference detection module configured to detect and store one or more reference paths corresponding to each resource type of a plurality of resources in the container deployment environment;
 a resource ordering module configured to generate a recreation sequence by ordering the plurality of resources based on corresponding references at the reference paths, such that a referenced resource is recreated before the referring resource; and
 an application recreation module configured to recreate an application based on the recreation sequence;
 wherein the resource ordering module is further configured to:
  perform a pre-recreation check for each resource type to check whether a recreation of the resource type is required;
  perform a pre-recreation modification for each resource type if one or more reference fields of a resource have to be modified to comply with the sequence of recreation; and
  perform a post-recreation modification for each resource type if one or more reference fields of a resource have to be modified to comply with the sequence of recreation.

2. The system of claim 1, wherein the reference detection module is configured to automatically detect the one or more reference paths corresponding to each resource type at start-up or when a new resource definition is identified by scanning binary schemas or text schemas for one or more resource types in the container deployment environment.

3. The system of claim 2, wherein the reference detection module is further configured to augment auto-detection of the one or more reference paths corresponding to a resource type based on manual updates.

4. The system of claim 1, wherein the resource ordering module is further configured to create a resource with an updated name if an identical resource is recreated in the same namespace.

5. The system of claim 1, wherein the resource ordering module is further configured to:
 detect, based on corresponding references, if one or more resources are shared with more than one application, and
 generate the recreation sequence such that an application recreation does not conflict with any other application that is currently using the one or more shared resources.

6. The system of claim 1, wherein the container deployment environment is a Kubernetes environment.

7. A system for reference-aware application recreation in a container deployment environment, the system comprising:
 a memory storing one or more processor-executable routines; and
 a processor communicatively coupled to the memory, the processor configured to execute the one or more processor-executable routines to:
 detect and store one or more reference paths corresponding to each resource type of a plurality of resources in the container deployment environment;
 generate a recreation sequence by ordering the plurality of resources based on corresponding references at the reference paths such that a referenced resource is recreated before the referring resource;
 recreate an application based on the recreation sequence;
 perform a pre-recreation check for each resource type to check whether a recreation of the resource type is required;
 perform a pre-recreation modification for each resource type if one or more reference fields of a resource have to be modified to comply with the sequence of recreation; and
 perform a post-recreation modification for each resource type if one or more reference fields of a resource have to be modified to comply with the sequence of recreation.

8. The system of claim 7, wherein the processor is configured to execute the one or more processor-executable routines to automatically detect the one or more reference paths corresponding to a resource type by scanning binary schemas or text schemas for one or more resource types in the container deployment environment.

9. The system of claim 7, wherein the processor is configured to execute the one or more processor-executable routines to create a resource with an updated name if an identical resource is recreated in the same namespace.

10. The system of claim 7, wherein the processor is configured to execute the one or more processor-executable routines to:
   detect, based on corresponding references, if one or more resources are shared with more than one application, and
   generate the recreation sequence such that an application recreation does not conflict with any other application that is currently using the one or more shared resources.

11. The system of claim 7, wherein the container deployment environment is a Kubernetes environment.

12. A method for reference-aware application recreation in a container deployment environment, the method comprising:
   detecting and storing one or more reference paths corresponding to each resource type of a plurality of resources in the container deployment environment;
   generating a recreation sequence by ordering the plurality of resources based on corresponding references at the reference paths such that a referenced resource is recreated before the referring resource;
   recreating an application based on the recreation sequence;
   performing a pre-recreation check for each resource type to check whether a recreation of the resource type is required;
   performing a pre-recreation modification for each resource type if one or more reference fields of a resource have to be modified to comply with the sequence of recreation; and
   performing a post-recreation modification for each resource type if one or more reference fields of a resource have to be modified to comply with the sequence of recreation.

13. The method of claim 12, wherein the method comprises automatically detecting the one or more reference paths corresponding to each resource type at start-up or when a new resource definition is identified by scanning binary schemas or text schemas for one or more resource types in the container deployment environment.

14. The method of claim 13, wherein the method further comprises augmenting auto-detection of the one or more references corresponding to a resource type based on manual updates.

15. The method of claim 12, wherein the method further comprises creating a resource with an updated name if an identical resource is recreated in the same namespace.

16. The method of claim 12, wherein the method further comprises:
   detecting, based on corresponding references, if one or more resources are shared with more than one application, and
   generating the recreation sequence such that an application recreation does not conflict with any other application that is currently using the one or more shared resources.

17. The method of claim 12, wherein the container deployment environment is a Kubernetes environment.

* * * * *